(12) United States Patent
Chatterjee et al.

(10) Patent No.: US 8,060,486 B2
(45) Date of Patent: Nov. 15, 2011

(54) AUTOMATIC CONVERSION SCHEMA FOR CACHED WEB REQUESTS

(75) Inventors: Manjirnath Chatterjee, San Francisco, CA (US); Gregory R. Simon, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 12/116,697

(22) Filed: May 7, 2008

(65) Prior Publication Data
US 2008/0281798 A1    Nov. 13, 2008

Related U.S. Application Data

(60) Provisional application No. 60/916,307, filed on May 7, 2007.

(51) Int. Cl.
G06F 7/00 (2006.01)
G06F 17/30 (2006.01)

(52) U.S. Cl. ......... 707/705; 707/716; 707/722; 707/756

(58) Field of Classification Search ............. 707/716, 707/736, 756, 705, 722, 755
See application file for complete search history.

(56) References Cited

U.S. PATENT DOCUMENTS

| | | |
|---|---|---|
| 5,020,090 A | 5/1991 | Morris |
| 5,105,184 A | 4/1992 | Pirani et al. |
| 5,297,142 A | 3/1994 | Paggeot et al. |
| 5,403,639 A | 4/1995 | Belsan et al. |
| 5,625,673 A | 4/1997 | Grewe et al. |
| 5,664,228 A | 9/1997 | Mital |
| 5,724,655 A | 3/1998 | Grube et al. |
| 5,727,159 A | 3/1998 | Kikinis |
| 5,797,089 A | 8/1998 | Nguyen |
| 5,870,680 A | 2/1999 | Guerlin et al. |
| 5,873,045 A | 2/1999 | Lee et al. |

(Continued)

FOREIGN PATENT DOCUMENTS

EP    1215575 A2    6/2002

(Continued)

OTHER PUBLICATIONS

Non-Final Office Action Mailed Jun. 11, 2010, U.S. Appl. No. 11/873,305, 21 pages.

(Continued)

*Primary Examiner* — Don Wong
*Assistant Examiner* — Merilyn Nguyen

(57) ABSTRACT

Various embodiments are directed to a proxy system for implementing an automatic conversion schema which allows data results from a publishing application to be extracted and displayed by a display application other than the publishing application. In one embodiment, a proxy publisher may receive a request from a publishing application to retrieve a data result from a data server. The request may include a path to the data server and appended publishing parameters. In accordance with the automatic conversion schema, the publishing parameters may comprise decode parameters associated with the publishing application for allowing a display application other than the publishing application to decode variables of the data result and to transform the decoded variables for display. The proxy publisher may cache the request including the appended publishing parameters and retrieve the data result from the data server. The proxy publisher may locally store the data result along with the cached publishing parameters and may respond to a query from a display application for data associated with the publishing application by providing the cached data result and the publishing parameters to the display application. Other embodiments are described and claimed.

25 Claims, 11 Drawing Sheets

U.S. PATENT DOCUMENTS

| | | | |
|---|---|---|---|
| 5,983,073 | A | 11/1999 | Ditzik |
| 6,034,321 | A | 3/2000 | Jenkins |
| 6,157,982 | A | 12/2000 | Deo et al. |
| 6,311,209 | B1 | 10/2001 | Olson et al. |
| 6,401,113 | B2 | 6/2002 | Lazaridis et al. |
| 6,546,262 | B1 | 4/2003 | Freadman |
| 6,577,877 | B1 | 6/2003 | Charlier et al. |
| 6,625,472 | B1 | 9/2003 | Farazmandnia et al. |
| 6,633,759 | B1 | 10/2003 | Kobayashi |
| 6,779,019 | B1 | 8/2004 | Mousseau et al. |
| 6,895,220 | B2 | 5/2005 | Usui |
| 6,947,975 | B2 | 9/2005 | Wong |
| 6,957,085 | B2 | 10/2005 | Shin et al. |
| 6,999,792 | B2 | 2/2006 | Warren |
| 7,013,112 | B2 | 3/2006 | Haller et al. |
| 7,047,038 | B1 | 5/2006 | Macor |
| 7,054,594 | B2 | 5/2006 | Bloch et al. |
| 7,383,061 | B1 | 6/2008 | Hawkins |
| 7,928,310 | B2 * | 4/2011 | Georges et al. ................ 84/645 |
| 2002/0151283 | A1 | 10/2002 | Pallakoff |
| 2004/0076155 | A1 * | 4/2004 | Yajnik et al. ................ 370/389 |
| 2004/0122774 | A1 | 6/2004 | Studd et al. |
| 2005/0027818 | A1 | 2/2005 | Friedman et al. |
| 2005/0038900 | A1 | 2/2005 | Krassner et al. |
| 2005/0144284 | A1 * | 6/2005 | Ludwig et al. ................ 709/226 |
| 2006/0168101 | A1 | 7/2006 | Mikhailov et al. |
| 2006/0184613 | A1 | 8/2006 | Stienessen et al. |
| 2006/0242278 | A1 | 10/2006 | Hawkins |
| 2007/0198698 | A1 | 8/2007 | Boyd et al. |
| 2007/0239884 | A1 | 10/2007 | Karmakar et al. |
| 2008/0034031 | A1 | 2/2008 | Weisbrot et al. |
| 2008/0098093 | A1 | 4/2008 | Simon et al. |
| 2008/0147671 | A1 | 6/2008 | Simon et al. |
| 2008/0248813 | A1 | 10/2008 | Chatterjee |
| 2008/0248834 | A1 | 10/2008 | Chatterjee et al. |
| 2008/0281798 | A1 | 11/2008 | Chatterjee et al. |
| 2009/0055749 | A1 | 2/2009 | Chatterjee et al. |

FOREIGN PATENT DOCUMENTS

| | | |
|---|---|---|
| EP | 1330098 A1 | 7/2003 |
| WO | 9926159 A2 | 5/1999 |
| WO | 2009018277 A1 | 2/2009 |

OTHER PUBLICATIONS

PCT International Search Report and Written Opinion, Application No. PCT/US2006/014060, Published Sep. 1, 2006, 12 pages.

Dasgupta, S., et al, "A Movable User Interface Based on a Simple X-Window Like Protocol", Gas Authority of India Ltd., (3), Aug. 1991, pp. 199-203.

* cited by examiner

*900*

*900*

AUTOMATIC CONVERSION SCHEMA FOR CACHED WEB REQUESTS

RELATED APPLICATIONS

This application claims priority to U.S. Provisional Patent Application Ser. No. 60/916,307, which was filed on May 7, 2007. This application is related and claims priority to U.S. patent application Ser. No. 11/873,305 titled "Offline Automated Proxy Cache for Web Applications," which was filed on Oct. 16, 2007. This application is related and claims priority to and U.S. patent application Ser. No. 11/612,282 titled "System for Running Web Applications Offline and Providing Access to Native Services," which was filed on Dec. 18, 2006. These applications are incorporated by reference.

BACKGROUND

In recent years, many web-based applications have been developed that take advantage of asynchronous data-loading techniques (e.g., AJAX, FLEX, etc.). These techniques (typically implemented using a combination of technologies such as HTML, XHTML, XML, JavaScript, ECMAScript, CSS, Macromedia® Flash®, etc.) enable an application to dynamically update portions of a web page without requiring a reload of the entire page. For example, a typical sports-related web page may include a dynamic score ticker. When the web page is loaded using a client web browser, a script or other small program (e.g., JavaScript, ECMAScript, etc.) may be run by the browser that retrieves the latest scores on a periodic basis. As the latest scores are retrieved, the score ticker is updated in the browser accordingly (without refreshing/reloading the web page). In this manner, data updates are limited to the content that is actually changed (e.g., score information), rather than encompassing the contents of the entire web page, thereby reducing used bandwidth. Additionally, the perceived interactivity and responsiveness of the application may be improved.

One limitation with the asynchronous data loading techniques described above is requiring the client application (e.g., web browser) to be running for data updates to take place. In the case of the sports web page described above, the client web browser must be running in order for the embedded script to download additional, updated scores. This poses problems where the application/browser must be periodically closed or shut down. For instance, handheld/mobile devices such as cellular phones, personal digital assistants (PDAs), mobile PCs, and the like typically have limited memory or battery power, making it difficult to have a large application such as a web browser continuously running. In these situations, data updates cannot be downloaded when the application/browser is closed. Additionally, since the updates are not downloaded, they cannot be stored for later use. Thus, if the application/browser is re-launched at a time when network connectivity is unavailable (e.g., on an airplane), it is not possible to display the most recent information or information that was recent as of the last time network connectivity was available.

Another limitation with the techniques described above is that the data results downloaded by web applications, scripted runtimes, and Java or Virtual Machine (VM) based software generally are formatted for viewing only by the client web browser or application that requested the data. As such, the data results can only be viewed when the calling application/browser is running and cannot be published for display by applications other than the calling application/browser. Additionally, obtaining data results from several different applications requires the concurrent running of entire applications and does not allow published information to be combined in a unified way.

DETAILED DESCRIPTION

Various embodiments are directed to a proxy system for implementing an automatic conversion schema which allows data results from a publishing application to be extracted and displayed by a display application other than the publishing application. In one embodiment, a proxy publisher may receive a request from a publishing application to retrieve a data result from a data server. The request may include a path to the data server and appended publishing parameters. In accordance with the automatic conversion schema, the publishing parameters may comprise decode parameters associated with the publishing application for allowing a display application other than the publishing application to decode variables of the data result and to transform the decoded variables for display. The proxy publisher may cache the request including the appended publishing parameters and retrieve the data result from the data server. The proxy publisher may locally store the data result along with the cached publishing parameters and may respond to a query from a display application for data associated with the publishing application by providing the cached data result and the publishing parameters to the display application.

In some cases, the proxy publisher may implement a mechanism such that automated proxy requests, such as those described in U.S. patent application Ser. No. 11/873,305 titled "Offline Automated Proxy Cache for Web Applications," can be stored and decoded by separate outside applications without the need for explicitly understanding the schema of the application which initiated the original proxy request. This decoded information can then be formatted and displayed by the outside application providing a live data minimized view of the original application.

The automatic conversion schema also may allow data results from different applications to be optionally published so that other applications can locally publish the data. In some implementations, data results of several separately sleeping applications may be displayed as an aggregate dashboard.

Figure 1:
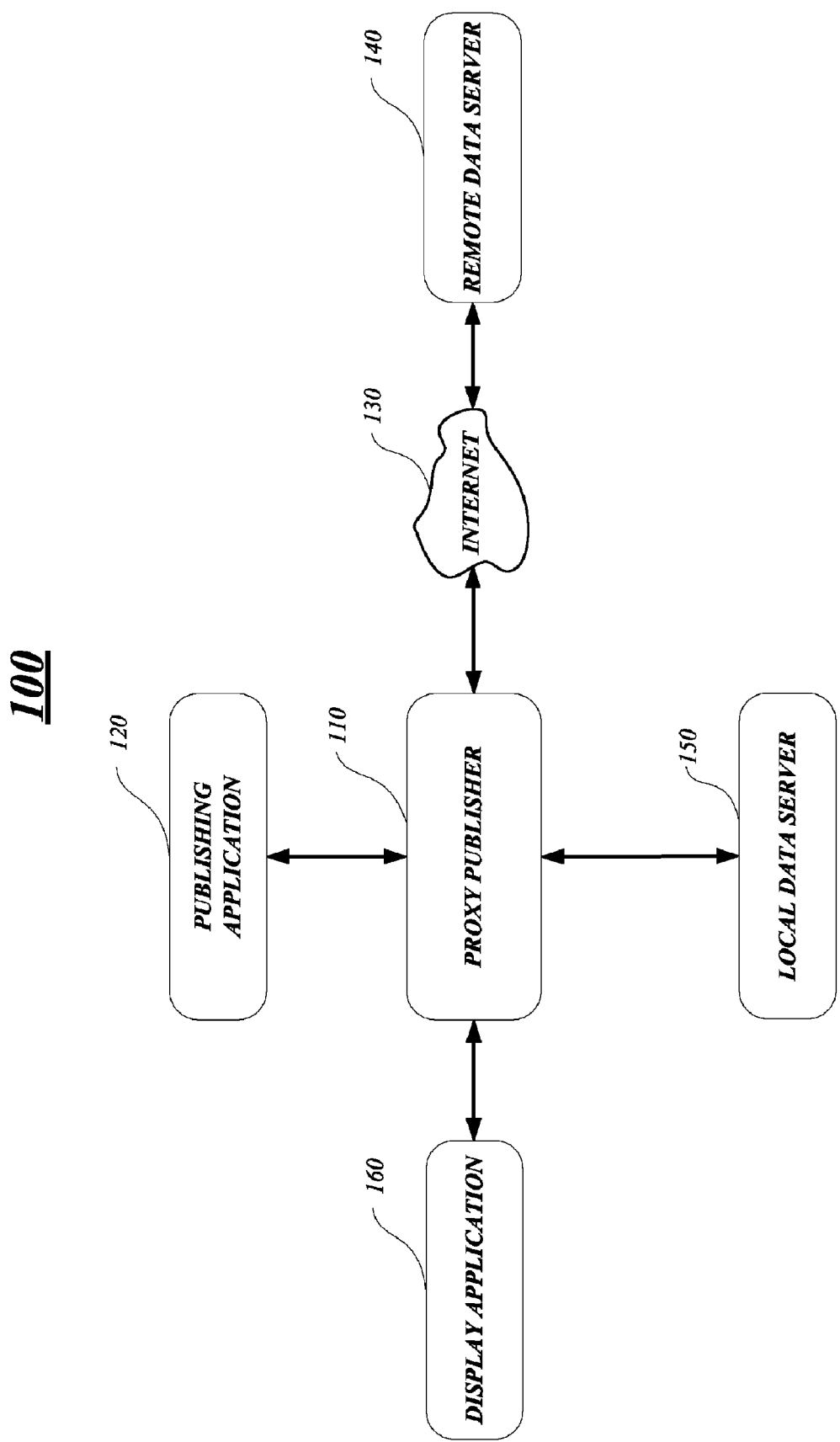
FIG. 1 illustrates a proxy system.

FIG. 1 illustrates a proxy system 100 for implementing an automatic conversion schema in accordance with the described embodiments. Elements of the system 100 may comprise various physical and/or logical components for communicating information which may be implemented as hardware components (e.g., computing devices, processors, logic devices), executable computer program instructions (e.g., firmware, software) to be executed by various hardware components, or any combination thereof, as desired for a given set of design parameters or performance constraints.

As shown, the proxy system 100 may comprise a proxy publisher 110 which may be implemented in software, hardware, or combination thereof. In some embodiments, the proxy publisher 110 may be implemented as an insert or plug-in for a web browser (e.g., Internet Explore®, Mozilla®, Firefox®, Safari®, Opera®, Netscape Navigator®). In other embodiments, the proxy publisher 110 may be implemented as an operating system (OS) function/service such as insert to the network stack of an OS such as a Microsoft® OS, Unix® OS, Linux® OS, Palm OS®, Symbian OS®, Embedix OS, Binary Run-time Environment for Wireless (BREW) OS, JavaOS, a Wireless Application Protocol (WAP) OS, or other suitable OS in accordance with the described embodiments. In alternative embodiments, the proxy publisher 110 may be implemented as a standalone software application.

The proxy publisher 110 may receive a request from a publishing application 120 to retrieve a data result. In some embodiments, the publishing application 120 may be implemented as a web based application or a browser-based application. In such embodiments, the publishing application 120 may use various web protocols and technologies such as HTML, XHTML, XML, Flash/ActionScript, JavaScript, ECMAScript, JScript, Basic, Visual Basic, VBScript, Asynchronous JavaScript and XML(Ajax), Flex, Java, Python, Perl, C#/.net, Flash®, and/or other suitable programming, scripting, or Virtual Machine (VM) based languages. The publishing application 120 also may be implemented by one or more dedicated informational programs for accessing live data such as RSS readers and AJAX (Asynchronous JavaScript and XML) based widgets such as those used by the Apple Dashboard, Yahoo Widget engine, and the like.

In some cases, the publishing application 120 may request a data result over the Internet 130 from a remote data server 140. The publishing application 120 also may request data from an intranet or LAN based local server 150, an RSS feed, FTP feed, or other information source in accordance with the described embodiments. It can be appreciated that both Internet-based servers (e.g., remote data server 140) and local services (e.g., local data server 150) can be proxied, scheduled, and published.

In one exemplary embodiment, the publishing application 120 may comprise an XHTML widget written in JavaScript and XHTML. The proxy publisher 110 may receive a request (e.g., Ajax request) from the publishing application 120 to retrieve a data result over the Internet 130 from the remote data server 140. The request from the publishing application 120 may include a path to the remote data server 140 such a Uniform Resource Locator (URL) and appended publishing parameters.

The proxy publisher 110 may process the request from the publishing application 120 by caching the request including the appended publishing parameters and passing through the path to the remote data server 140. The remote data server 140 may respond in normal fashion by returning a data result. The proxy publisher 110 may receive the data result from the remote data server 140 and process the data result by locally storing the data result with the cached publishing parameters for the publishing application 120.

The publishing parameters may comprise decode parameters associated with the publishing application 120 for allowing a display application 160 other than the publishing application 120 to decode variables of the data result and to transform the decoded variables for display. The decode parameters may name the variables which can be extracted to publish a minimized representation of the publishing application 120. For example, a widget may publish a minimized representation of a weather application by releasing only the day's high temperature or a minimized representation of an e-mail application by releasing only the number of unread messages.

The decode parameters also may comprise data extraction rules and data formatting rules for instructing the display application 160 how to extract web-request data (e.g. weather) from data result (e.g., response text), how to format the data (e.g. put this string+with the extracted web-request data), and how to display the data (e.g., display supplementary information such as a URL or text along with the response text).

Subsequently, the proxy publisher 110 may receive a query from the display application 160. In some cases, the display application 160 may request data from a specific named request. For example, the display application 160 may request data associated with the publishing application 120. In other cases, the display application may ask the proxy publisher 110 for a listing of all names for currently stored non-private (published) request data. By default, the proxy publisher 110 may return all the named rules if the display application 160 does not ask for a particular name.

Upon receiving an available name selected by the display application 160, the proxy publisher 110 may provide a matching result including the locally stored data results and the publishing parameters to the display application 160. The display application 160 may process the matching result by using the extraction rules to extract and decode the variables and using the formatting rules to display the extracted values in an appropriate manner. In some embodiments, the proxy publisher 110 may reduce the processing required by the display application by extracting the variables from the data result using the data extraction rules and providing the extracted variables to the display application 160 along with the data formatting rules.

In general, when the publishing application 120 is a web-based application, the display application 160 may be implemented as a viewer application or mobile device home screen outside of the web browser which cannot render standard web based content. For example, the display application 160 may comprise a C/C++ active home screen, news aggregator, billboard, or mobile device ticker where only a small amount of information is displayed but that requires transformation of the cached data results to be usable. By using the decode parameters provided by the publishing application 120, the display application 160 can transform the cached data into a format that it can use. Once the display application 160 has obtained the variables in a usable format, the display application 160 may republish the data in another format.

In accordance with the automatic conversion schema, the publishing parameters may comprise decode parameters for allowing the display application 160 to decode variables of the data result and to transform the decoded variables for display. The decode parameters may comprise a name parameter (e.g., var_name) and a variable name for allowing the publishing application 120 to name the variables extracted. The variable name may be used by outside applications to address a parameter left by the web application. The variable name may not be the name encoded in the offline proxy request, but it is the name (e.g., "Temp_Hi") referred to by an outside application.

The decode parameters may comprise a data extraction rules parameter (e.g., extraction_rules, var_extract_regex) and instructions for extracting information from the response or data result. The publishing application 120 may cause the proxy publisher 110 to store, with the information request, instructions for extracting information from the response. The extracting instructions may be used by an outside application (e.g., display application 160) or the proxy publisher 110 to extract (find) the information referred to by the name parameter (e.g., var_name) from the stored offline proxy request.

The extracting instructions may be implemented as a regular expression (regex) (e.g., JSON call): get_bytes[23-28] or a "capturing regular expression" in a server side scripting languages such as PERL regex. The extracting instructions also may be implemented via XPath or XQuery. The extracting instructions also may comprise an XSLT transformation. The extracting instructions also may comprise a custom program which is, in itself, the instructions for processing the request. For example, the stored instructions for extracting information from the data result may be implemented as an XHTML page containing JavaScript.

The decode parameters may comprise a data formatting rules parameter (e.g., formatting_rules) and instructions for displaying variables from the data result in a format used by an outside application (e.g., the display application 160). The publishing application 120 may cause the proxy publisher 110 to store, with the information request, a set of optional separate instructions for how to display and format the extracted data. The formatting instructions may comprise a string which is what an extracting application can display in an alert dialog. This parameter can be duplicated with different language parameters. The formatting instructions can be a transforming rule-set which takes the extracted value and displays it in a certain format (e.g. if 2007.04.11 is the date, then it is transformed via a regex to Apr. 11, 2007) such via XSLT. The extraction instructions are used to extract the data returned by a server located at the URL formed by the calling application (e.g., publishing application 120), and the formatting instructions detail how the extracted data should appear in a certain application (e.g., display application 160) outside of the calling application.

The formatting instructions may be implemented by a regular expression (regex) separate from the regex used to extract the data. The formatting instructions also may comprise an XSLT transformation. The formatting instructions also may be implemented as a stored program in its own right. For example, the stored program is itself passed as a parameter which takes the extracted data and displays or formats the extracted data in a way which an outside application other than the calling application can use and process. For example, the stored program may comprise a scripted application such as XHTML+JavaScript. The display and formatting instructions also may be implemented by a custom language created for the purpose of formatting the extracted data. The display and formatting instructions also may be implemented by A C/C++ sprintf( ) capable string function parameter.

The decode parameters may comprise a private parameter (e.g., set_request_private) which may be implemented by a flag set so that the offline proxy request will not be readable by outside applications. The publishing application 120 may deliberately not expose its data by directing the proxy to never honor a request from certain applications to provide security. As such, certain application may be prevented from receiving cached data results and publishing parameters for a given publishing application 120. Accordingly, the publishing application 120 may make offline requests that are private (not shared) with other applications.

The publishing parameters may comprise event parameters or commands for asking the proxy publisher 110 to perform actions on behalf of the application outside of request handling to allow web applications to behave as normal applications but with a background wakeup task. Whether the optional parameters can be executed is security level and operating system dependent.

The event parameters may comprise a wake_upon (condition) parameter or command for requesting the proxy publisher 110 to wake up (launch) an application when a certain offline proxy condition is met (e.g., e-mail received). Whether the application will actually be launched is left to security permissions or the operating system.

The proxy publisher 110 may implement an operating system service for sleeping applications to publish services which can be read and passed to other applications. For example, a C/C++ application can use the proxy publisher 110 to post a request which self updates and presents a shared publishable result. In general, any compiled (statically linked) application can use the proxy publisher 110 to wake up when a certain wake up condition is met.

The event parameters may comprise an alert_upon (condition) parameter or command for requesting the proxy publisher 110 to post an alert to the operating system when a condition is met (e.g., publishing application 120 needs attention). This allows a web application to post information via the proxy publisher 110. The response may be a posted message in a dialog box or a textual or iconic notification on the home screen/idle screen of the device. For example, a scripted widget application running on a cell phone device may provide an e-mail viewing service and may set an event such that when the proxy publisher 110 discovers a new e-mail, an event request is posted to the device idle screen so that the user knows to look at their e-mail. The alert parameters also may comprise an optional alert_msg, parameter and an optional alert urgency parameter.

The offline capabilities of a publishing application 120 may be restricted in accordance with operating system security policies. For example, the proxy publisher 110 may interact with the operating system security policies and permissions to restrict use of publishing application offline capabilities. In some embodiments, the proxy publisher 110 will, for security purposes, include the application signature ID or referring page for the operating system to determine whether to execute a request in response to a wake up or alter condition.

In various embodiments, the proxy publisher 110 may comprise an offline automated proxy cache implemented as described in U.S. patent application Ser. No. 11/873,305 titled "Offline Automated Proxy Cache for Web Applications," which was filed on Oct. 16, 2007 and is entirely incorporated by reference. As such, the proxy publisher 110 may support scheduling and automatic repeating of requests for updated data. In various embodiments, scheduling parameters may be used to automatically retrieve updated versions of requested content behalf of the publishing application 120 while the publishing application 120 is offline (e.g., closed, runtime not running, VM not running, etc.). In such embodiments, the proxy publisher 110 may make repeated Ajax requests on behalf of the publishing application 120 110 which are repeatedly scheduled to run, even when the publishing application 120 is not running.

The publishing parameters may comprise scheduling parameters including, for example, a time interval parameter that defines a time interval for requesting data updates, a history parameter defining a maximum number of versions of the data that may be cached simultaneously, a data expiry parameter specifying when data in the cache expires, a retry parameter defining a number of times to retry a connection, and others.

Repeating/auto-scheduled requests may be terminated by overwrite (e.g., if the publishing application 120 sends an identical request with no scheduling parameters, then scheduling is removed), by explicit request deletion (e.g., if the publishing application 120 sends a parameter to delete the published request via serial number then the auto scheduled request is removed), by application deletion (e.g., if the publishing application 120 is deleted by the user or the operating system, then all autopublish, and proxy requests associated with the application are removed from the system), by programmatic flush (e.g., an API exists on the proxy publisher 110 to suspend a given or all proxy-publish requests), and/or by timeout (e.g., if a given publishing application does not renew the proxy publish request in a given time such as two weeks, then the proxy publisher 110 may allow the repeated proxy request to age out, stop repeating, and be deleted from the queue along with any stored data and rules.

In various embodiments, some or all the above publishing parameters may be wrapped in a namespace determined by the application using the proxy publisher 110. This namespace wrapping may performed automatically by the proxy publisher 110. For example, if a publishing application 120 such as MySuperWidget.wgt calls the proxy publisher 110, the stored query and request data will be put in a namespace or table which is prefixed by MySuperWidget. In this way different applications can store requests with the proxy publisher 120, and the results will be kept separate to avoid naming conflicts (e.g., two different vendors using the same variable name). Reverse URL naming (e.g., com.lampdesk.MySuperWidget) is explicitly encouraged for some implementations. In addition, a public namespace also may be provided for intercommunication messaging.

Exemplary publishing parameters (e.g., scheduling and event parameters) that may be used by the proxy publisher 110 may include, but are not limited to, the following:

| Parameter | Description | Example |
|---|---|---|
| T | Time interval - the time interval to re-run the request. The last character determines the units (m = minutes; h = hours; s = seconds; d = days). In one set f embodiments, if this parameter is not present, the proxy cache will not be (re)programmed (although it may still return results to the client application). | t = 60 m |
| H | Cache history - Number of versions of a piece of data to keep in the cache. In various embodiments, data are stored in a first-in, first-out (FIFO) fashion. | H = 4 |
| F | Force network connection - Erases cache entries and the scheduler entry. | F |
| E | Data expiry - Specifies when the data in the cache will expire. The last character may be used to determine the unit of time (m = minutes; h = hours; s = seconds; d = days; inf = infinity). | E = inf |
| Ret | Retry - Number of retries to attempt a connection to the remote server (does not include retries requested by the client application directly). | Ret = 20 |
| sT | Timing - Specifies a time at which to begin offline content updates, including passthrough and delayed update modes. | sT = 2007.10.10:1600 |
| maxSize | Size of updates - Specifies the maximum size, in bytes, for each data update. | MaxSize = 3400 |
| clear | Cache clear - Clears the cache and instructs the proxy to obtain the requested data from the remote server. May return a failure of the network/server is unavailable. | clear = 1 |
| wake | Notify - May be used to send a wake/notify event to the client application, including instructions to load a specific web page. This allows for a browser-based application to be activated upon the occurrence of a specific event. | wake = app:ieexplore.exe(param) |
| Id | Session Proxy ID - A serial number for retrieving specific proxy events. May be generated by the client application or the proxy cache. May be universally unique or correspond to an application name/ID pair, where the ID is unique within the namespace of the application. | Id = 12345678 |
| conType | Attempts to run the proxy when network coverage has a known monetary cost. | conType = 'gprs' |

In some embodiments, the publishing parameters may be represented as HTTP header name-value pairs. For example, the data request received by the proxy publisher 110 may comprise an HTTP request, and the publishing parameters may correspond to one or more HTTP headers. In other embodiments, the publishing parameters may be represented using other standard web language constructs.

While downstream servers may see the HTTP headers, through proper selection of HTTP header name-value pairs, such downstream servers may simply ignore these headers. This allows interoperability with existing web systems without incurring additional design overhead or compatibility issues with existing web browsers, servers, or other web infrastructure.

To use the proxy publisher 110 with existing web-based applications, developers may add appropriate HTTP headers (corresponding to publishing parameters) to the HTTP requests generated by their applications. For example, the following JavaScript code may be used:

```
r = new XMLHttpRequest( );
...
r.setRequestHeader('X-WebVM-Schedule', 't=60m,h=1');
...
r.send(...);
```

To set up the automatic conversion schema for an outside application to access offline proxy information, the following JavaScript code may be used:

```
r = new XMLHttpRequest( );
...
r.setRequestHeader( 'X-WebVM-Schedule', 'var_name=temp_high' );
r.setRequestHeader( 'X-WebVM-Schedule','var_extract_regex=
document.findElement ByID(hitemp)');
r.setRequestHeader( 'X-WebVM-Schedule','variable_name_text=
Today the high temp is:' );
r.send(..);
```

To set up an alert for allowing a scripted application to wake up when a certain event is received, the following JavaScript code may be used:

```
r = new XMLHttpRequest( );
...
r.setRequestHeader( 'X-WebVM-Schedule', 'var_name=temp_high' );
r.setRequestHeader( 'X-WebVM-Schedule',alert_upon=
document.findElementByID(hitemp)>10' );
...
r.send(...)
```

In some embodiments, HTTP headers may comprise individual parameters as shown above. In other embodiments, some or all the parameters may be consolidated in a single request such as:
r.setRequestHeader('X-WebVM-Schedule', 'param1=x, param2=y,param3=z')

In various implementations, the described embodiments may save battery life and memory by not requiring runtime to execute at all times. The described embodiments also may allow a universal way for information to be extracted from scripted applications and displayed, parameterized and understood by outside applications. In addition, multiple applications may effectively "actively sleep" by publishing their live information which can be formatted and displayed. Multiple scripted/web apps may run offline notifications at the same time. Scripted applications may be provided with a uniform method of 'waking up' and posting alerts/notifications. Scripted application security may be preserved. Proxied requests may be scheduled and used across an embedded operating system.

While certain exemplary embodiments may be described for purposes of illustration, it can be appreciated that the automatic conversion schema may be implemented for various types of cached protocol systems operating in a client-server environment.

Figure 2:
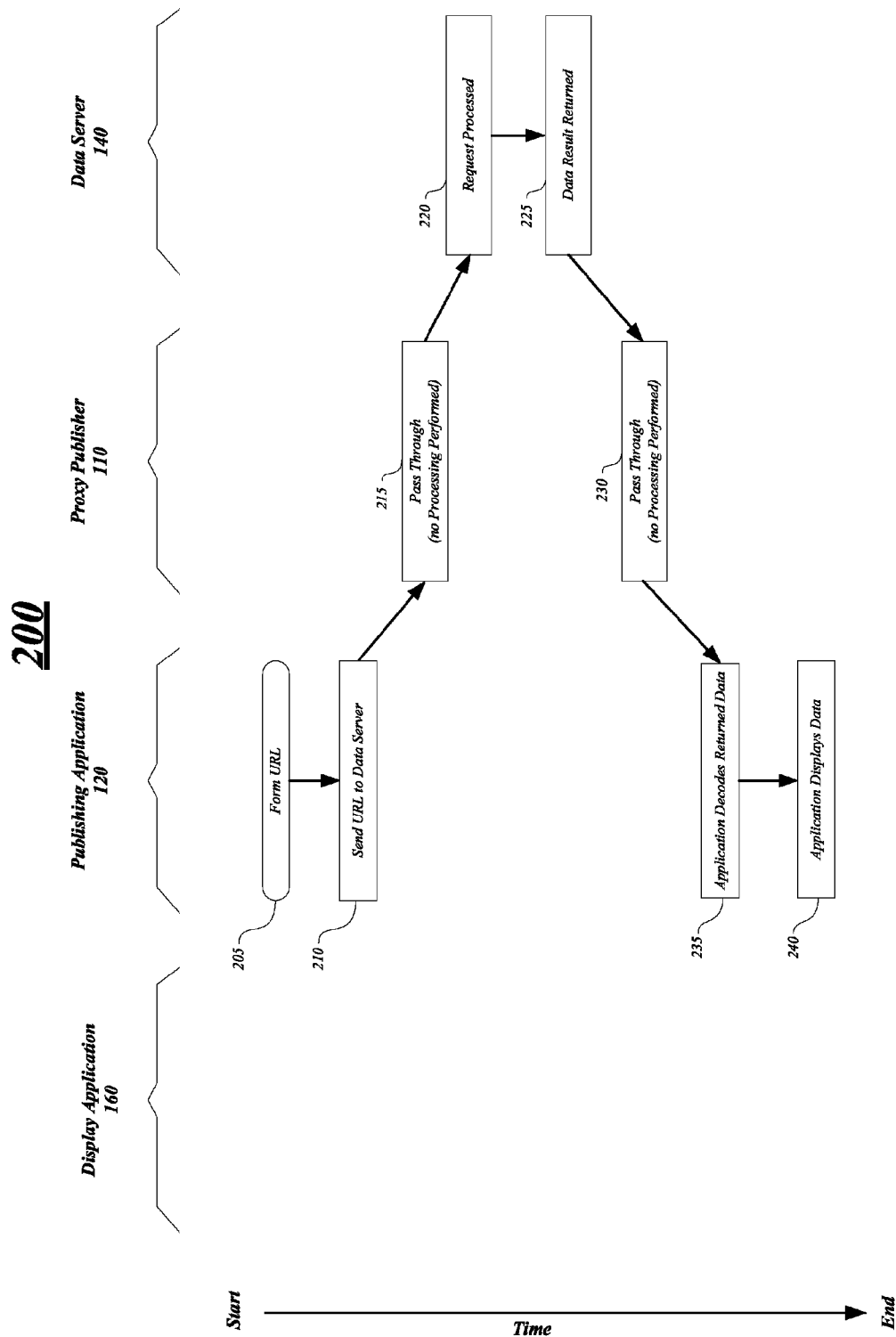
FIGS. 2-5 illustrate various proxy system logic flows.

FIG. 2 illustrates one embodiment of a proxy system logic flow 200. The logic flow 200 may be performed by various systems and/or devices and may be implemented as hardware, software, firmware, and/or any combination thereof, as desired for a given set of design parameters or performance constraints. For example, the logic flow 200 may be implemented by executable programming instructions to be executed by a logic device (e.g., computer, processor).

As shown, the logic flow 200 depicts various operations performed by a proxy publisher 110, a publishing application 120, a data server 140, and a display application 160 with respect to a time line with the top being earlier in time and the bottom being later in time. This embodiment shows the proxy publisher 110 in a passive (pass-through) mode.

In operation, the publishing application 120 forms a URL (step 205) and sends a request (e.g., Ajax request) comprising the URL to the data server 140 (step 210). The proxy publisher 110 passes through the URL to the data server 140 without performing any processing (step 215). The data server 140 processes the request (step 220) and returns a data result (step 225). The proxy publisher 110 passes through the data result to the publishing application 120 without performing any processing (step 230). The publishing application 120 decodes the returned data (step 235) and displays the data (step 240).

Figure 3:
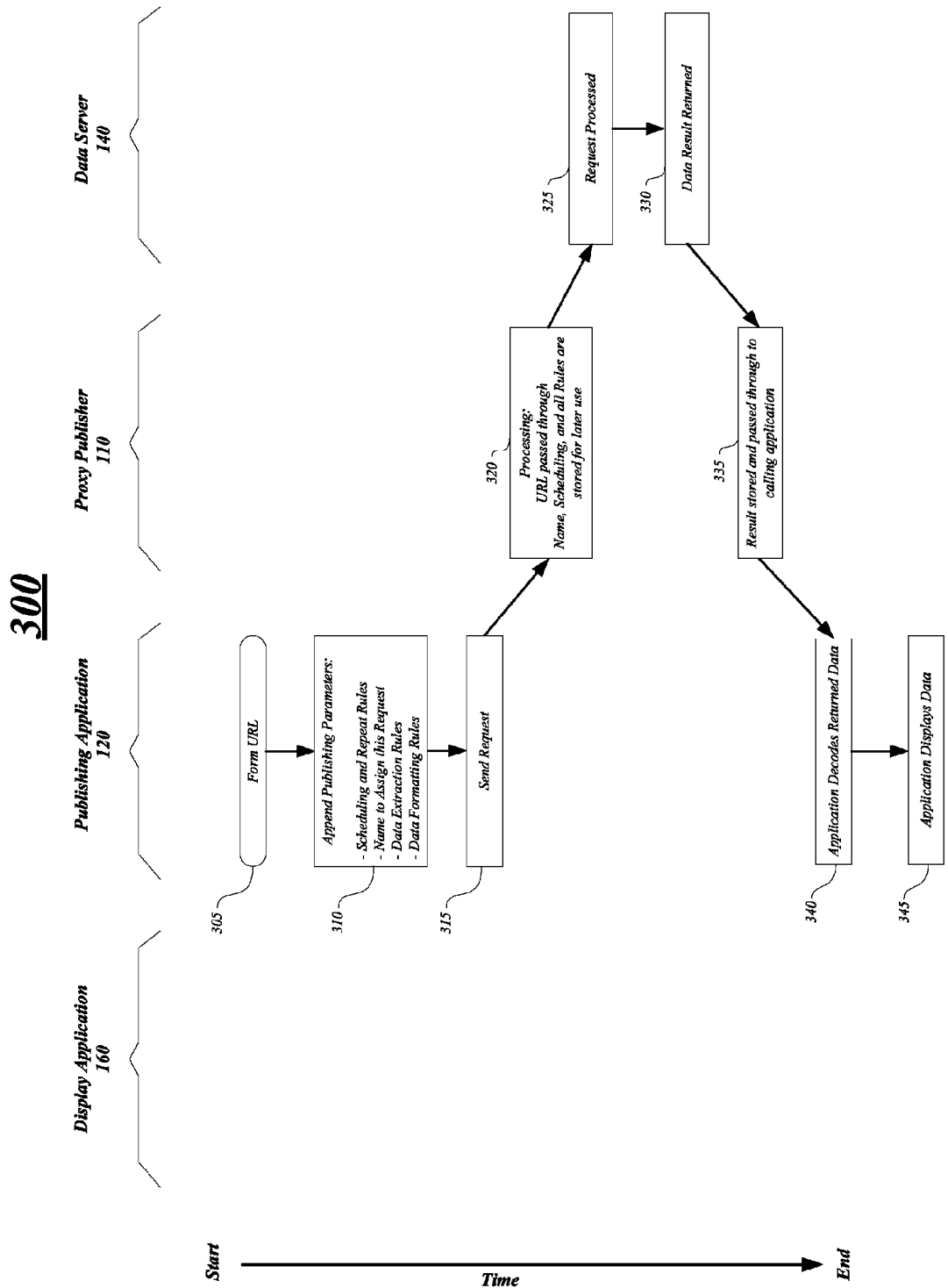

FIG. 3 illustrates one embodiment of a proxy system logic flow 300. The logic flow 300 may be performed by various systems and/or devices and may be implemented as hardware, software, firmware, and/or any combination thereof, as desired for a given set of design parameters or performance constraints. For example, the logic flow 300 may be implemented by executable programming instructions to be executed by a logic device (e.g., computer, processor).

As shown, the logic flow 300 depicts various operations performed by a proxy publisher 110, a publishing application 120, a data server 140, and a display application 160 with respect to a time line with the top being earlier in time and the bottom being later in time. This embodiment shows the publishing of information and demonstrates that original, standards based requests still work, but results are also stored for later use.

In operation, the publishing application 120 forms a URL (step 305) and appends publishing parameters including scheduling and repeat rules, name to assign to the request, data extraction rules, and data formatting rules (step 310). The publishing application 120 then sends the request (e.g., Ajax request) comprising the URL and the appended publishing parameters (step 315).

The proxy publisher 110 processes the request by passing through the URL to the data server 140 and storing the name, scheduling, and all rules for later use (step 320). The data server 140 processes the request (step 325) and returns a data result (step 330). The proxy publisher 110 stores the data result and passes through the data result to the publishing application 120 (step 335). The publishing application 120 decodes the returned data (step 340) and displays the data (step 345).

Figure 4:
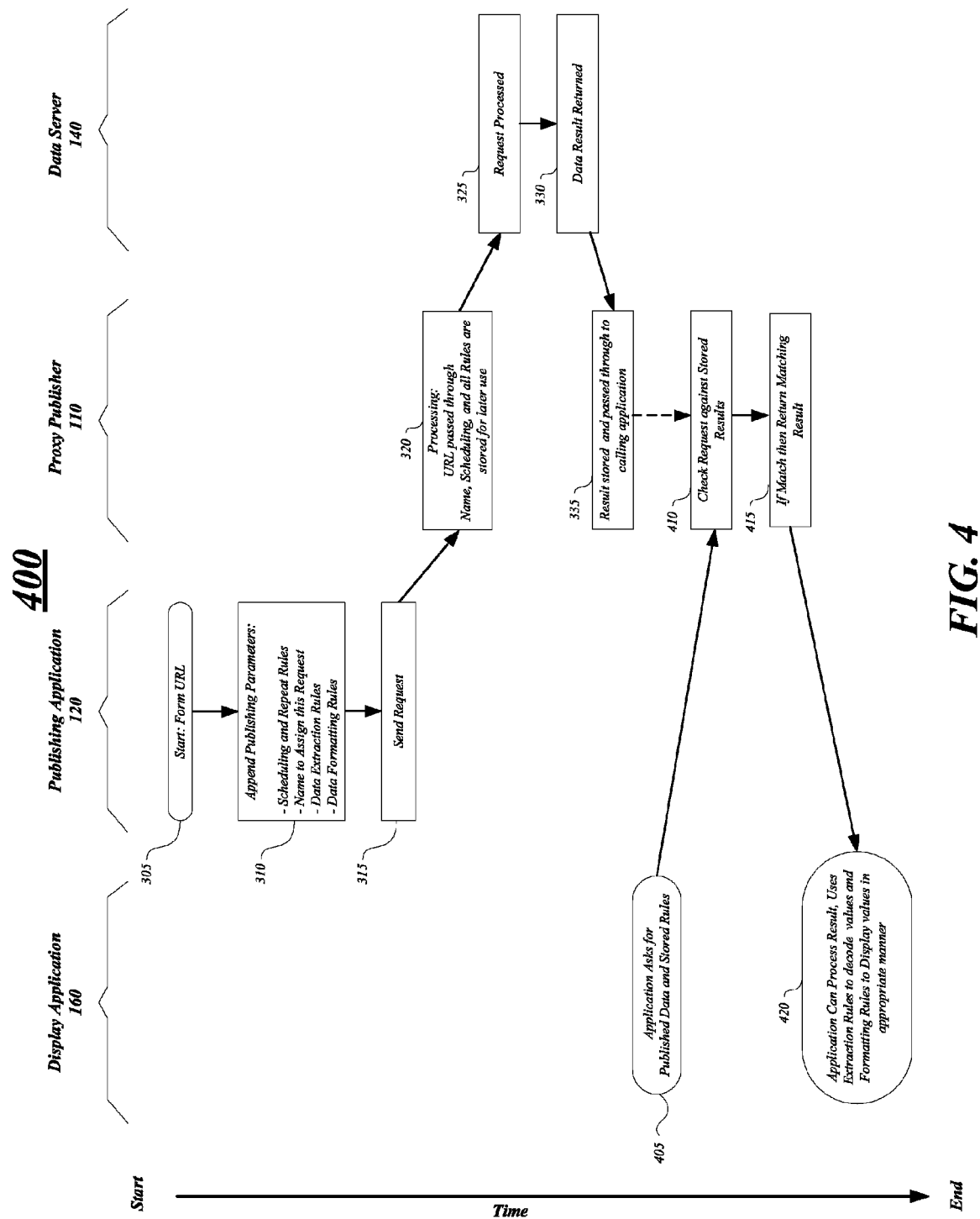

FIG. 4 illustrates one embodiment of a proxy system logic flow 400. The logic flow 400 may be performed by various systems and/or devices and may be implemented as hardware, software, firmware, and/or any combination thereof, as desired for a given set of design parameters or performance constraints. For example, the logic flow 400 may be implemented by executable programming instructions to be executed by a logic device (e.g., computer, processor).

As shown, the logic flow 400 depicts various operations performed by a proxy publisher 110, a publishing application 120, a data server 140, and a display application 160 with respect to a time line with the top being earlier in time and the bottom being later in time. This embodiment shows the proxy publisher 110 in use by another application (e.g., display application 160) to extract the stored published information from the publishing application 120 (e.g., Widget application) and the stored result and rules.

In operation, the publishing application 120 forms a URL (step 305) and appends publishing parameters including scheduling and repeat rules, name to assign to the request, data extraction rules, and data formatting rules (step 310). The publishing application 120 then sends the request (e.g., Ajax request) comprising the URL and the appended publishing parameters (step 315).

The proxy publisher 110 processes the request by passing through the URL to the data server 140 and storing the name, scheduling, and all rules for later use (step 320). The data server 140 processes the request (step 325) and returns a data result (step 330). The proxy publisher 110 stores the data result and passes through the data result to the publishing application 120 (step 335).

The display application 160 asks the proxy publisher 110 for published data and stored results (step 405). The proxy publisher 110 checks the request against the stored results (step 410) and if there is a match, the proxy publisher 110 returns the matching result to the display application 160 (step 415). Upon receiving the matching result, the display application 160 can process the matching result by using the extracting rules to decode values and by using the formatting rules to display values in an appropriate manner (step 420).

Figure 5:
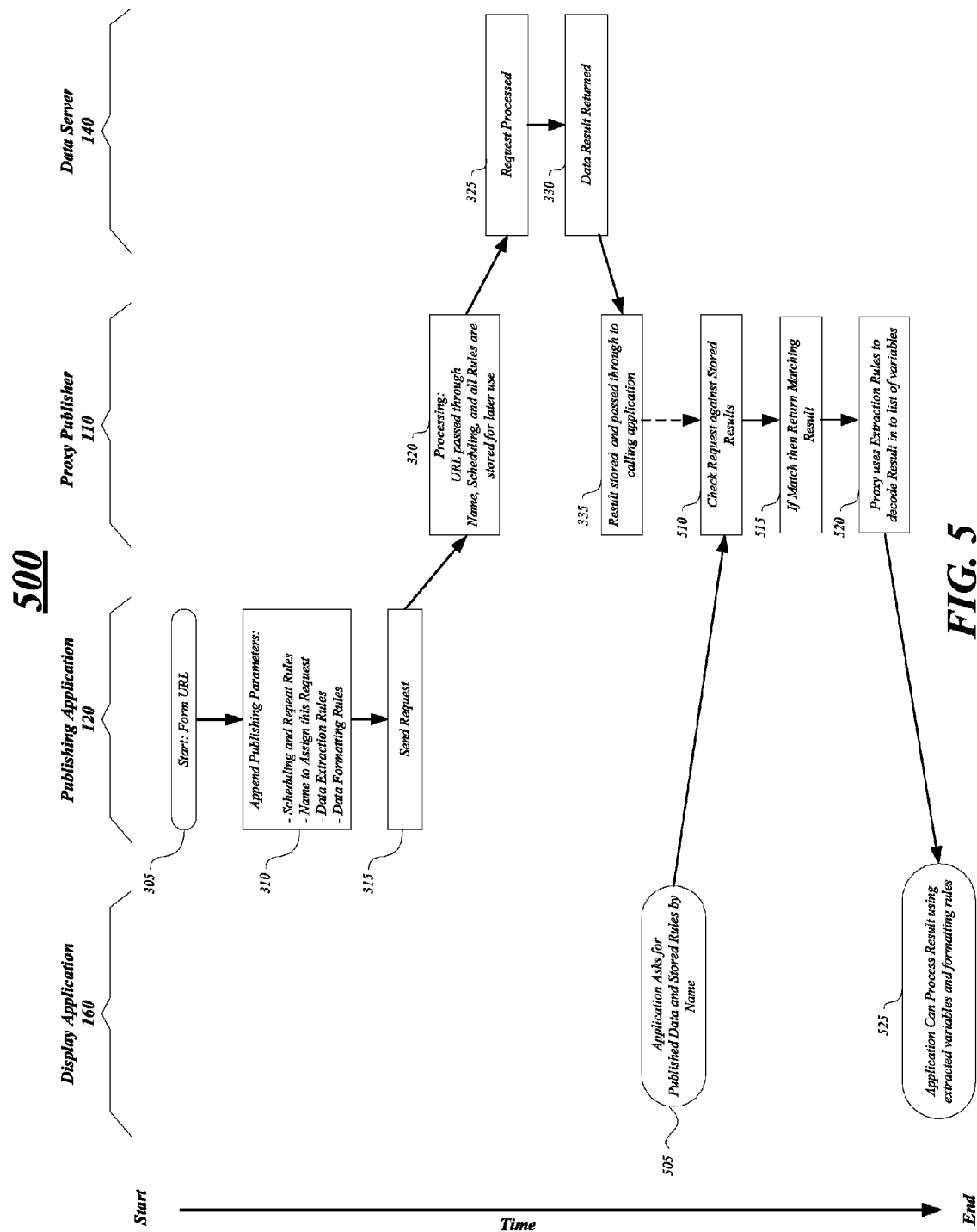

FIG. 5 illustrates one embodiment of a proxy system logic flow 500. The logic flow 500 may be performed by various systems and/or devices and may be implemented as hardware, software, firmware, and/or any combination thereof, as desired for a given set of design parameters or performance constraints. For example, the logic flow 500 may be implemented by executable programming instructions to be executed by a logic device (e.g., computer, processor).

As shown, the logic flow 500 depicts various operations performed by a proxy publisher 110, a publishing application 120, a data server 140, and a display application 160 with respect to a time line with the top being earlier in time and the bottom being later in time. This embodiment shows the proxy publisher 110 in use to perform variable extraction.

In operation, the publishing application 120 forms a URL (step 305) and appends publishing parameters including scheduling and repeat rules, name to assign to the request, data extraction rules, and data formatting rules (step 310). The publishing application 120 then sends the request (e.g., Ajax request) comprising the URL and the appended publishing parameters (step 315).

The proxy publisher 110 processes the request by passing through the URL to the data server 140 and storing the name, scheduling, and all rules for later use (step 320). The data server 140 processes the request (step 325) and returns a data result (step 330). The proxy publisher 110 stores the data result and passes through the data result to the publishing application 120 (step 335).

The display application 160 asks the proxy publisher 110 for published data and stored results by name (step 505). The proxy publisher 110 checks the request against the stored results (step 510) and if there is a match, the proxy publisher 110 returns the matching result to the display application 160 (step 515). The proxy publisher 110 uses the extraction rules to decode the result into a list of variables (step 520). Upon receiving the list of extracted variables, the display application 160 can process the matching result by using the formatting rules to display the extracted variables (step 525).

It is noted that in FIGS. 3-5, that steps 320-335 may be repeated as per the scheduling instructions, without any extra interaction with the publishing application 120. It is also noted that the extraction cycle 405-420 in FIG. 4 and 505-525 in FIG. 5 can also be continually repeated. It is further noted that both the request repeat cycle and the extraction cycles can run asynchronously of each other and may be multithreaded.

Figure 6:
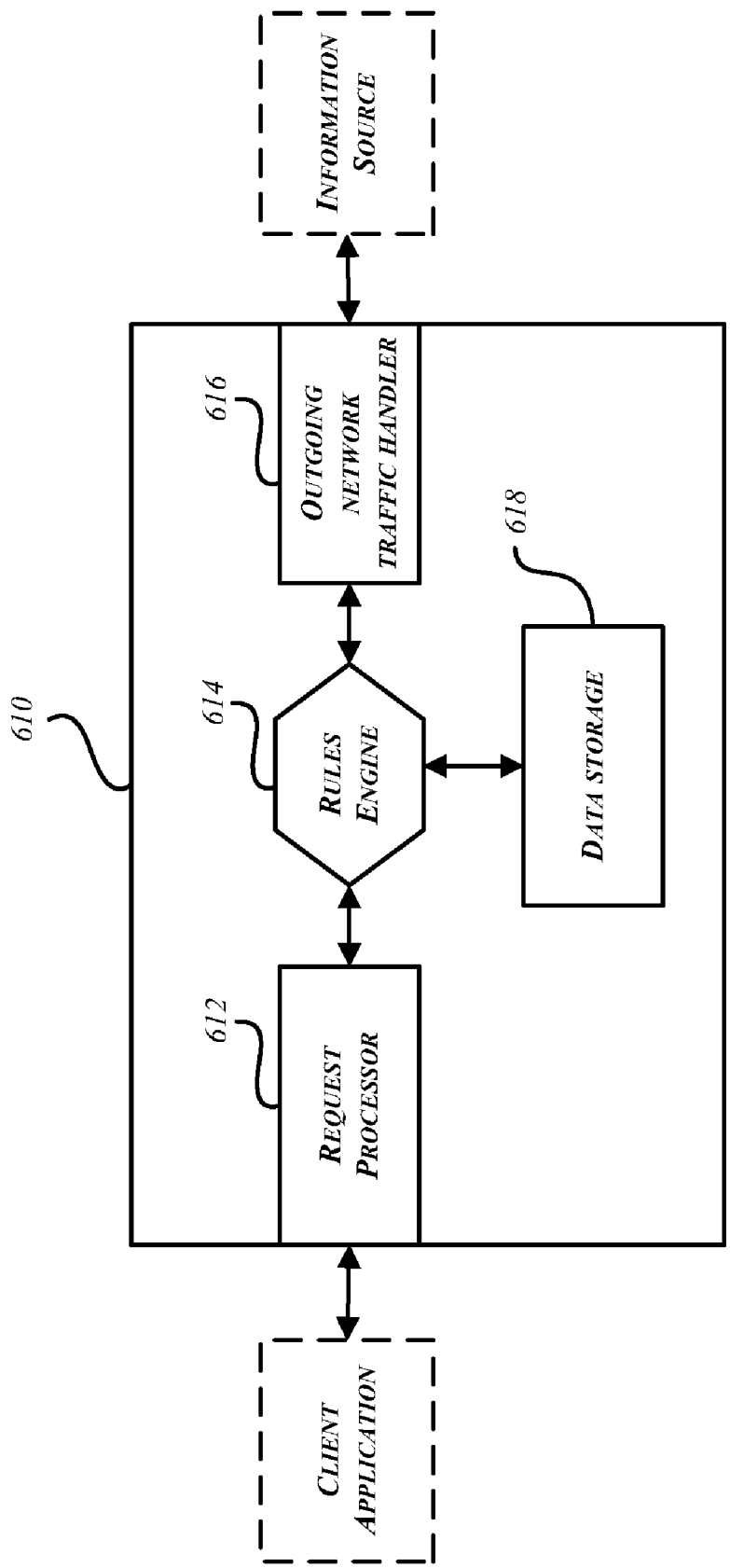
FIG. 6 illustrates a proxy system including a proxy publisher.

FIG. 6 illustrates proxy system 600 including a block diagram of a proxy publisher 610 suitable for implementing various embodiments. As shown, the proxy publisher 610 comprises a request processor 612, a rules engine 614, an outgoing network traffic handler 616, and a data storage device 618. The request processor 612 may be configured to receive data requests from a client application (e.g., publishing application 120, display application 160).

In various embodiments, the data requests may include a data path and one or more publishing parameters, and the request processor 612 is configured to identify the publishing parameters. The request and the identified publishing parameters may be passed to the rules engine 614, which may be configured to store the publishing parameters in the data storage device 216 and to pass the data path to the outgoing network traffic handler 616 for transmission to an information source (e.g., remote data server 140, local data server 150). Once a data result is received from the information source, the data results may be cached in the data storage device 618 along with the publishing parameters. In various embodiments, the publishing parameters may comprise scheduling parameters, decode parameters, and/or event parameters.

Figure 7:
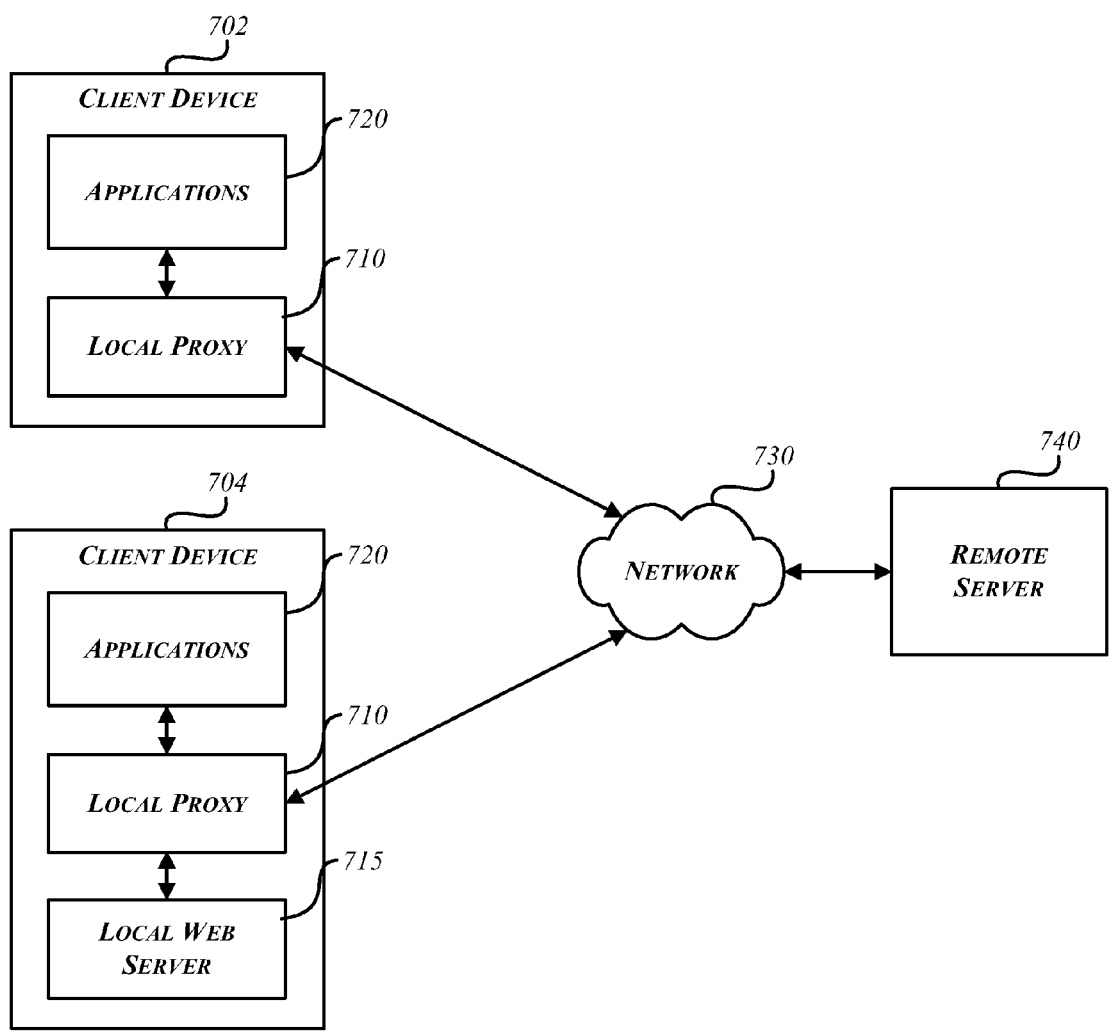
FIG. 7 illustrates a system environment.

FIG. 7 is a block diagram of an exemplary system environment 700 that may be used in accordance with various embodiments. The system environment 700 includes client computing devices 702, 704, which are used to run client applications 720 and local proxies 710. In various embodiments, the local proxies 710 represent instances of proxy publisher 110.

As shown, the client computing device 704 may also run a local web server 715. In various embodiments, the local web server 715 may be implemented as Hypertext Transfer Protocol (HTTP) server running locally on the client computing device 704. The local web server 715 may comprise and/or implement a server-side web services stack. The local web server 715 also may serve web-based applications to a web browser from a web archive comprising a collection of the necessary application files for a web application. In various embodiments, the local web server 715 may be implemented as a Web Virtual Machine (VM), and the web archive may be generated as described in U.S. patent application Ser. No. 11/612,282 titled "System for Running Web Applications Offline and Providing Access to Native Services," which was filed on Dec. 18, 2006 and is entirely incorporated by reference.

When implemented as a server on the client computing device 704, the local web server 715 may support and provide access to multiple applications and may locally run server side code such as PHP, Python, PERL or CGI programming environments. The local web server 715 also may implement web methods programming interfaces and web services extensions via SOAP, XML RPC, REST, and the like for enabling access to local resources of the client computing device 704. Accordingly, the client computing device 704 may provide server side interfaces to access local resources such as a file system, a phonebook, a media store, a database, a hardware component (e.g., camera, microphone, etc.), a software component, and/or other controlled resource. Such interfaces also may implement server side code for allowing the user to write to a local resource such as a phonebook, media store, and so forth. The local web server 715 also may implement various web based security models and access restrictions for evaluating function calls from a web browser which request access to local resources.

The client computing devices 702, 704 may be capable of communicating over a network 730 with a remote server 740. The local proxies 710 may act as intermediaries between the client applications 710 and the remote server 740. Thus, the client applications 720 may make data requests through the local proxies 710, which then forward the requests to the remote server 740. As described above the local proxies 710 may be configured to provide an offline mechanism for managing content updates and an automatic conversion schema.

Figure 8:
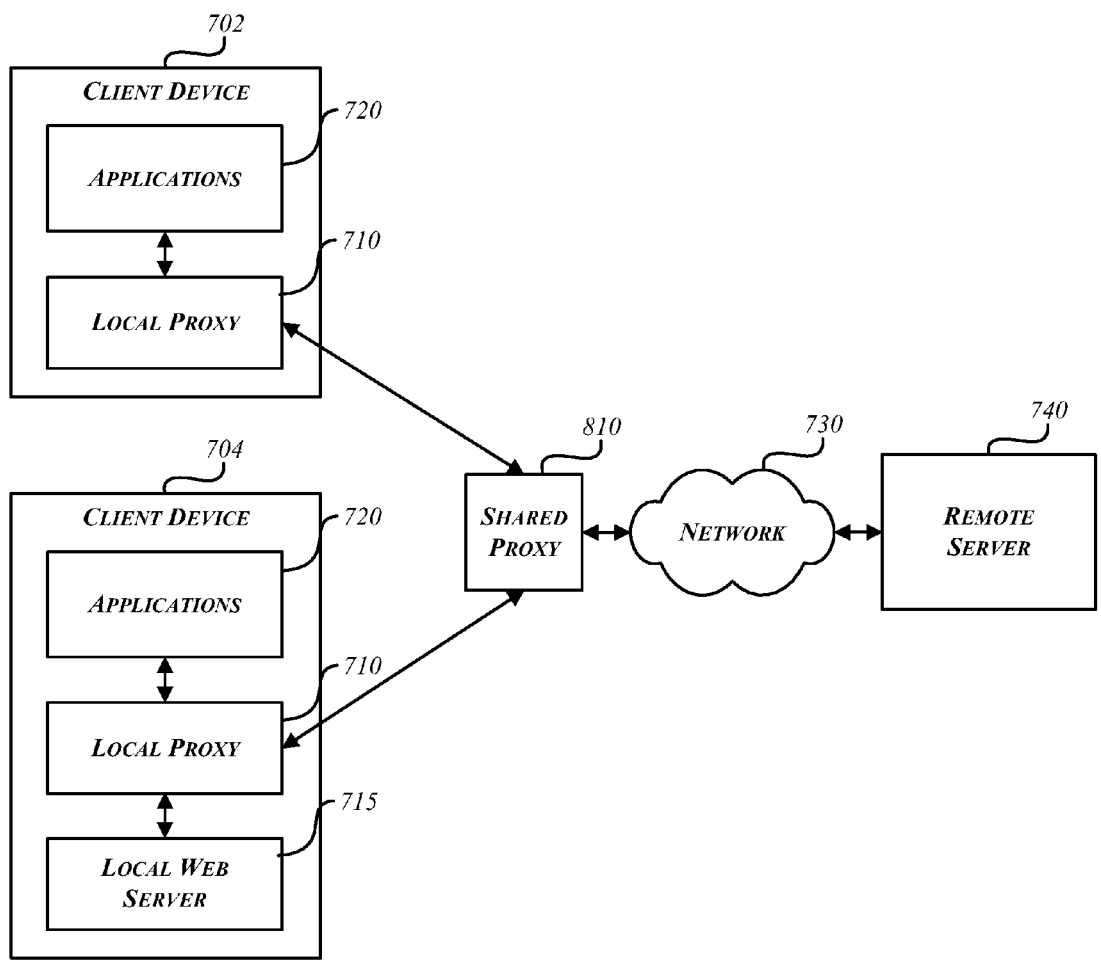
FIG. 8 illustrates a system environment.

FIG. 8 is a block diagram of another system environment 800 that may be used in accordance with the described embodiments. The system environment 800 is similar to system environment 700 of FIG. 7, but includes a shared proxy 810. As shown, the shared proxy 810 (which represents an instance of a proxy publisher 110), acts as an intermediary between local proxies 710 and the remote server 740. Thus, the proxy publisher may act as a shared proxy and have its cached data results and publishing parameters shared among multiple client devices/computers in a network.

FIGS. 9A-9D illustrate a proxy system 900 including a WebVM proxy 910. In various embodiments, the proxy system 900 may comprise a proxy publisher implemented by a WebVM as described in U.S. patent application Ser. No. 11/612,282 titled "System for Running Web Applications Offline and Providing Access to Native Services," which was filed on Dec. 18, 2006 and is entirely incorporated by reference.

Figure 9A:
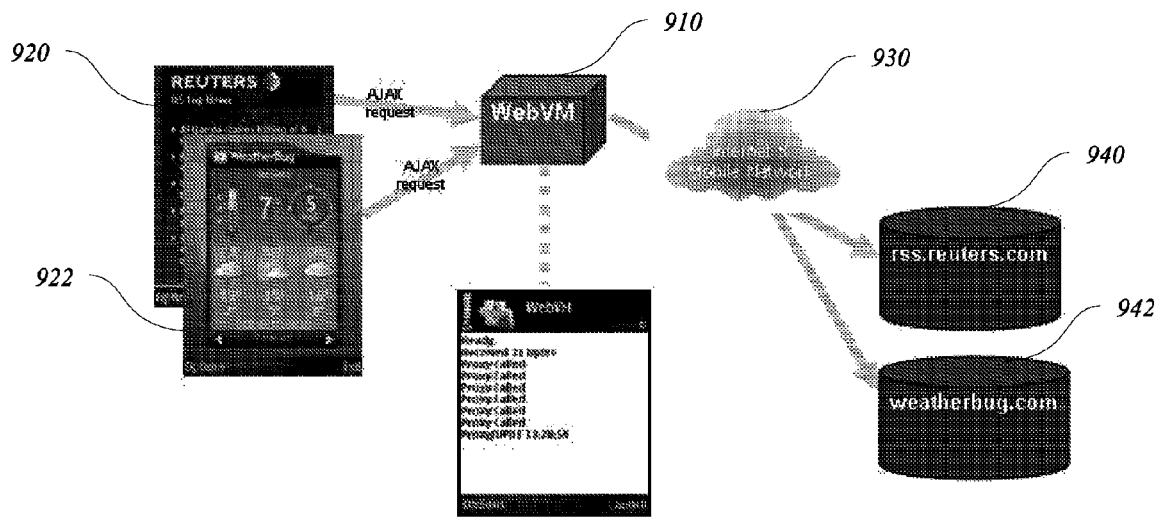
FIGS. 9A-9D illustrate a proxy system including a WebVM proxy.

As shown in FIG. 9A, the WebVM proxy 910 may be used by web applications 920, 922 to work in offline mode. In such mode, the WebVM proxy 910 may make repeated data requests over a network 930 to remote information sources 940, 942. It is noted that web browser domain origin security policy is maintained.

Figure 9B:
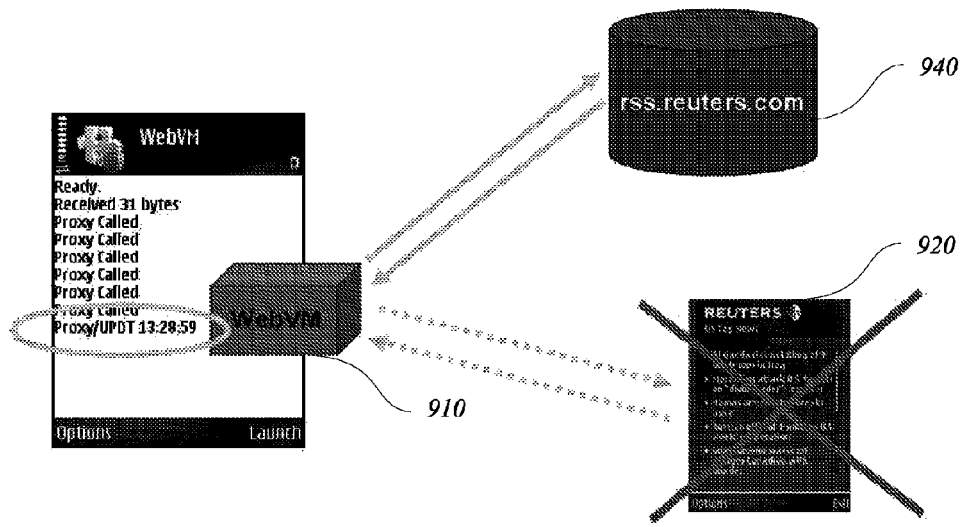
Figure 9C:
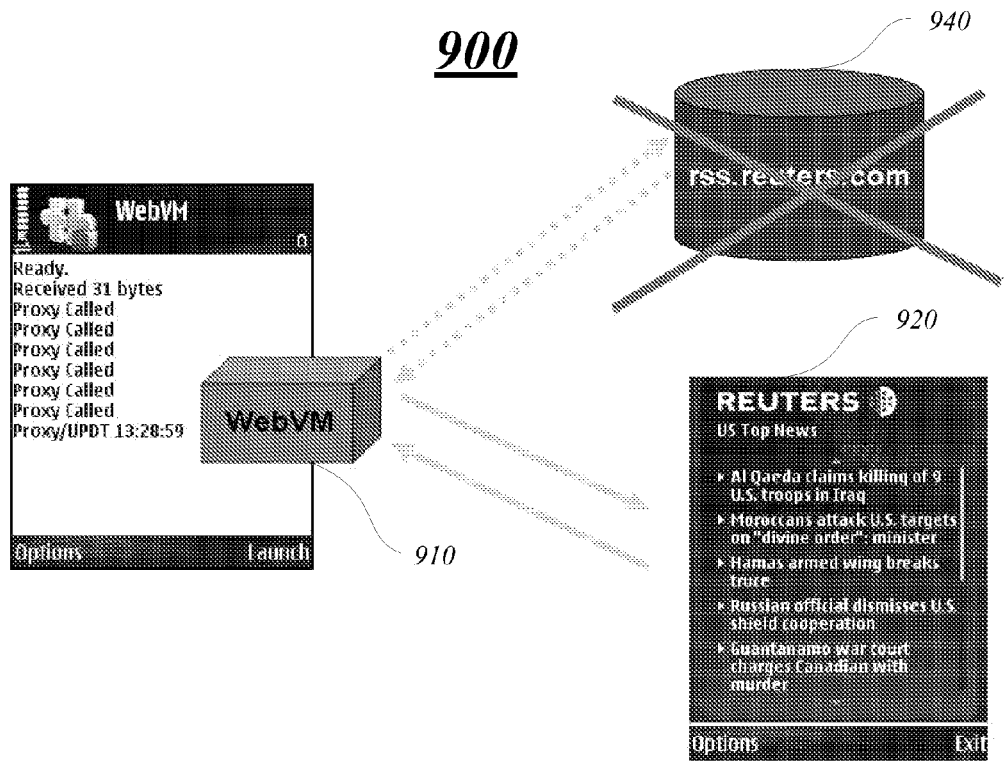

As shown in FIG. 9B, the WebVM proxy 910 can continue to run requests even when the calling web application 920 is not running. As shown in FIG. 9C, when there is no connectivity, the WebVM proxy 910 can serve cached requests to the web application 920.

Figure 9D:
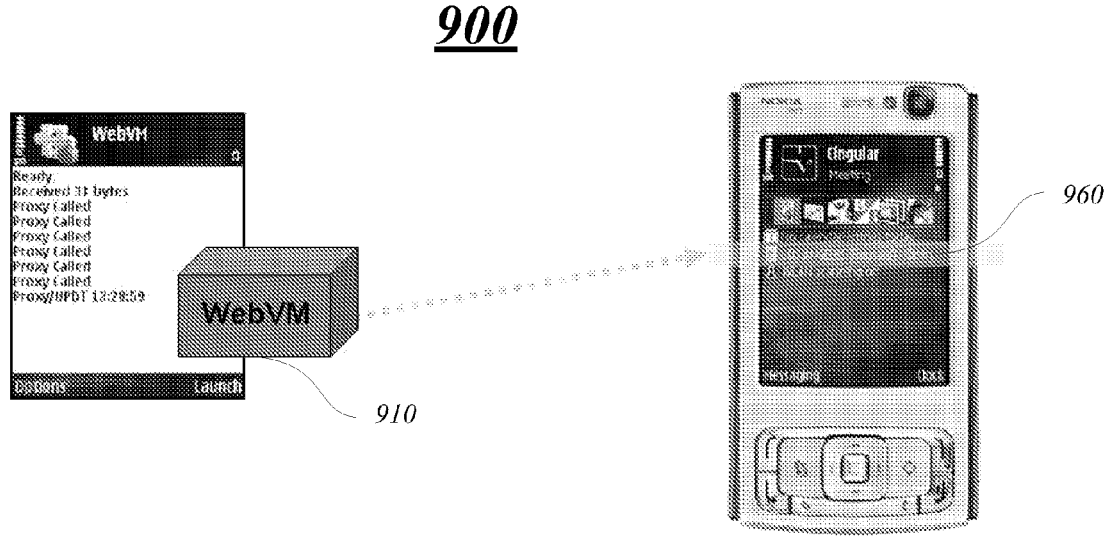

As shown in FIG. 9D, the WebVM proxy 910 can publish cached information. In this embodiment, the WebVM proxy 910 provides cached information from a dedicated news application 920 and weather application 922 for publishing by the active homescreen 960 of a mobile phone.

In some embodiments, rather than using a WebVM type of proxy, the publishing and request headers may be interpreted and proxied directly by the browser using browser based implementations and integration. In such embodiments, the proxy may be implemented by extra APIs in the browser DOM or in the JavaScript Engine embedded in the browser. In this case, the browser allows extra parameters to be used as part of its DOM APIs such as by invoking extra function call parameters. For example, an XMLHttpRequest object can accept extra member functions (methods) to store the extracting and formatting information instead of using HTTP headers. This accomplishes the identical task in a programmatic way. Exemplary pseudocode is shown below, where double slash '//' represents a comment.

1. newReq=new XMLHttpRequest( );
2. newReq.SetExtractionRules("xml:title"); //use a simplified xpath expression
3. newReq.SetFormatRule("C:'the result is % s')//set formatting rules—in this case a C style sprintf string will print the extracted title shown in step 2.

Such extra APIs also can be used to publish the XMLHttpRequest data and related network calls to an outside application (e.g., a C++ application) when the browser is not running so that these outside applications can use the information created by the web applications. In various embodiments, the proxy may implement an XML schema for decoding a generic XMLHttpRequest in to a set of name value pairs. Such name value pairs may be stored in a database table and/or accessed via a SOAP or WebServices API.

The described API based method also can apply to any language as a library. For example, the proxy can be used as an adjunct library of function calls for C or C++ or Java programs. In other words, instead of using HTTP request headers, scheduling, extraction, and formatting rules are passed as function or method call parameters. The functions and parameters to call the proxy can be global functions or object oriented in nature. The proxy can be used via a direct API in Java and JavaME. The proxy can be used via C/C++ runtimes on operating systems such as Symbian, Windows/Win32, Linux, and so forth.

Figure 10:
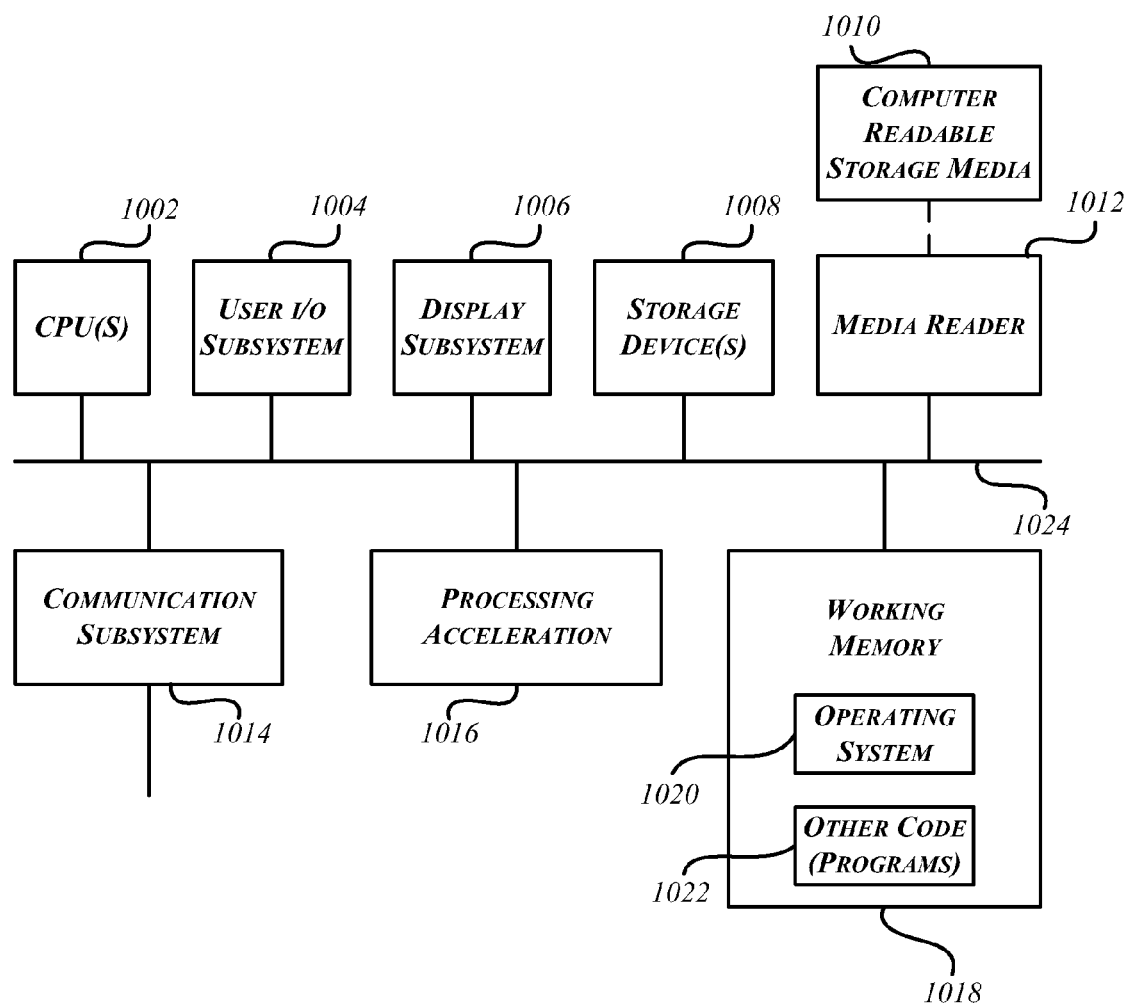
FIG. 10 illustrates a computing device.

FIG. 10 illustrates an exemplary computing device 1000 that may be used in accordance with various embodiments. The computing device 1000 may be implemented, for example, as a personal computer (PC), desktop PC, notebook PC, laptop computer, mobile computing device, smart phone, personal digital assistant (PDA), mobile telephone, combination mobile telephone/PDA, billboard, embedded computer, video device, television (TV) device, digital TV (DTV) device, high-definition TV (HDTV) device, media player device, gaming device, messaging device, or any other suitable communications device in accordance with the described embodiments.

In some embodiments, the computing device 1000 may be implemented as a mobile device such as a combination handheld computer and mobile telephone or smart phone. In such embodiments, the mobile device generally may be configured to support or provide cellular voice communication, wireless data communication, and computing capabilities in accordance with the described embodiments.

The mobile device may provide voice and wireless data communications functionality by communicating with a mobile network such as a Code Division Multiple Access (CDMA) network, Global System for Mobile Communications (GSM) network, North American Digital Cellular (NADC) network, Time Division Multiple Access (TDMA) network, Extended-TDMA (E-TDMA) network, Narrowband Advanced Mobile Phone Service (NAMPS) network, third generation (3G) network such as a Wide-band CDMA (WCDMA) network, CDMA-2000 network, Universal Mobile Telephone System (UMTS) network, and others.

The mobile device may support wireless wide area network (WWAN) data communications services including Internet access. Examples of WWAN data communications services may include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others.

The mobile device may provide wireless local area network (WLAN) data communications functionality in accordance with the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and others.

The mobile device also may be arranged to perform data communications functionality in accordance with shorter range wireless networks, such as a wireless personal area network (PAN) offering Bluetooth® data communications services in accordance with the Bluetooth® Special Interest Group (SIG) series of protocols, specifications, profiles, and so forth. Other examples of shorter range wireless networks may employ infrared (IR) techniques or near-field communication techniques and protocols, such as electro-magnetic induction (EMI) techniques including passive or active radio-frequency identification (RFID) protocols and devices.

The mobile device may comprise various software programs such as system programs and applications to provide computing capabilities in accordance with the described embodiments. Exemplary system programs may include, without limitation, an operating system (OS), device drivers, programming tools, utility programs, software libraries, application programming interfaces (APIs), and so forth.

The mobile device may provide a variety of applications for allowing a user to accomplish one or more specific tasks. Exemplary applications may include, without limitation, a web browser application, telephone application (e.g., cellular, VoIP, PTT), networking application, messaging application (e.g., e-mail, IM, SMS, MMS), contacts application, calendar application, word processing application, spreadsheet application, database application, media application (e.g., video player, audio player, multimedia player, digital camera, video camera, media management), location based services (LBS) application, gaming application, and so forth.

As shown, the computing device 1000 comprises hardware elements that may be electrically coupled via a bus 1024. The hardware elements may include one or more central processing units (CPUs) 1002, one or more input devices 1004 (e.g., a touch-screen, a keyboard, a mouse, etc.), and one or more output devices 1006 (e.g., a display, a printer, etc.). Computing device 1000 may also include one or more storage devices 1008. By way of example, the storage device(s) 1008 may include devices such as disk drives, optical storage devices, solid-state storage device such as a random access memory ("RAM") and/or a read-only memory ("ROM"), which can be programmable, flash-updateable and/or the like.

The computing device 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computing device 1000 also may include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. The communications system 1014 may permit data to be exchanged with a network and/or any other computer. For example, computer system 1000 may be part of a larger system/network environment including a plurality of interconnected computing devices.

The computing device 1000 also may comprise software elements, shown as being currently located within a working memory 1018, including an operating system 1020 and/or other code 1022, such as application 410 and proxy 412 of FIG. 1.

It should be appreciated that alternative embodiments of the computing device 1000 may have numerous variations from that described above. For example, customized hardware might also be used and/or particular elements might be implemented in hardware, software, or both. Further, connection to other computing devices such as network input/output devices may be employed.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, and/or combination thereof.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, while a particular logic flow may illustrate a certain sequence of steps, other sequences of steps may also be performed according to alternative embodiments. Moreover, some individual steps may include multiple sub-steps that may be performed in various sequences as appropriate to the individual step. Furthermore, additional steps may be added or removed depending on the particular implementation.

In various embodiments, logic flow may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Some embodiments may be implemented as an article of manufacture comprising a computer-readable storage medium to store executable computer program instructions for performing various operations as described herein. In such embodiments, a computer may include any suitable computer platform, device, system, or the like implemented using any suitable combination of hardware and/or software.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage medium in accordance with the described embodiments.

In various embodiments, a logic flow may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A method comprising:
receiving a request from a publishing application to retrieve a data result from a data server, the request including a path to the data server and appended publishing parameters, the publishing parameters comprising decode parameters associated with the publishing application for allowing a display application other than the publishing application to decode variables of the data result and to transform the decoded variables for display, the publishing application and the display application running on the same mobile device, the publishing application being a web-based application and the display application implemented as a screen of the mobile device outside of a web browser;
processing the request from the publishing application by caching the request including the appended publishing parameters and passing through the path to the data server;
receiving the data result from the data server; and
processing the data result from the data server by locally caching the data result with the cached publishing parameters for the publishing application.

2. The method of claim 1, wherein the decode parameters comprise a variable name for addressing a parameter of the publishing application.

3. The method of claim 1, wherein the decode parameters comprise data extraction rules for extracting variables from the data result.

4. The method of claim 1, wherein the decode parameters comprise data formatting rules for displaying variables from the data result in a format used by the display application.

5. The method of claim 1, wherein the decode parameters comprise private rules for preventing cached data result and publishing parameters from being read by certain applications.

6. The method of claim 1, wherein the publishing parameters comprise an event parameter for waking the publishing application.

7. The method of claim 1, wherein the publishing parameters comprise an event parameter for posting an alert.

8. The method of claim 1, further comprising restricting use of offline capabilities in accordance with operating system security policies.

9. The method of claim 1, wherein the publishing parameters comprise scheduling parameters for repeatedly requesting updated data results.

10. The method of claim 1, further comprising passing the data result to the publishing application.

11. The method of claim 1, further comprising receiving a query from a display application.

12. The method of claim 11, wherein the query from the display application requests data associated with the publishing application.

13. The method of claim 11, wherein the query from the display application requests cached data result and publishing parameters.

14. The method of claim 11, further comprising processing the query by providing locally stored data results and decode parameters for allowing the display application to decode variables of the data result and to transform the decoded variables for display.

15. The method of claim 11, further comprising processing the query by decoding variables of the data result using data extraction rules and providing the decoded variables and formatting rules for allowing the display application to transform the decoded variables for display.

16. A mobile computing device comprising:
a proxy publisher to receive a request from a publishing application to retrieve a data result from a data server, the request including a path to the data server and appended publishing parameters, the publishing parameters comprising decode parameters associated with the publishing application for allowing a display application other than the publishing application to decode variables of the data result and to transform the decoded variables for display; the publishing application and the display application running on the mobile device, the publishing application being a web-based application and the display application implemented as a screen of the mobile device outside of a web browser.

17. The computing device of claim 16, the proxy publisher to process the request from the publishing application by caching the request including the appended publishing parameters and passing through the path to the data server.

18. The computing device of claim 17, the proxy publisher to receive the data result from the data server and process the data result from the data server by locally storing the data result with the cached publishing parameters for the publishing application.

19. The computing device of claim 16, wherein the decode parameters comprise data extraction rules for extracting variables from the data result.

20. The computing device of claim 16, wherein the decode parameters comprise data formatting rules for displaying variables from the data result in a format used by the display application.

21. A computer-readable storage medium comprising executable computer program instructions that when executed enable a computing system to:
receive a request from a publishing application to retrieve a data result from a data server, the request including a path to the data server and appended publishing parameters, the publishing parameters comprising decode parameters associated with the publishing application for allowing a display application other than the publishing application to decode variables of the data result and to transform the decoded variables for display; the publishing application and the display application running on the same mobile device, the publishing application being a web-based application and the display application implemented as a screen of the mobile device outside of a web browser.

22. The computer-readable storage medium of claim 21, further computing computer program instructions that when executed enable a computing system to process the request from the publishing application by caching the request including the appended publishing parameters and passing through the path to the data server.

23. The computer-readable storage medium of claim 21, further computing computer program instructions that when executed enable a computing system to receive the data result from the data server and process the data result from the data server by locally storing the data result with the cached publishing parameters for the publishing application.

24. A computer-readable storage medium comprising executable computer program instructions that when executed enable a computing system to:
send a request from a publishing application to retrieve a data result from a data server, the request including a path to the data server and appended publishing parameters, the publishing parameters comprising decode parameters associated with the publishing application for allowing a display application other than the publishing application, to decode variables of the data result and to transform the decoded variables for display,
the publishing application and display application running on the same mobile device; the publishing application being a web-based application and the display application implemented as a screen of the mobile device outside of a web browser.

25. A computer-readable storage medium comprising executable computer program instructions that when executed enable a computing system to:
receive a cached data result and publishing parameters, the publishing parameters comprising decode parameters associated with a publishing application for allowing a display application other than the publishing application to decode variables of the data result and to transform the decoded variables for display;
the publishing application and the display application running on the same mobile device; the publishing application being a web-based application and the display application implemented outside of a web browser on the mobile device screen.

* * * * *